United States Patent [19]

Nakamura et al.

[11] Patent Number: 4,667,252
[45] Date of Patent: May 19, 1987

[54] FACSIMILE APPARATUS

[75] Inventors: Takuji Nakamura, Hirakata; Toshinori Otsuki, Yawata; Takeshi Nagasawa, Nara; Yoshihiro Ikemoto, Katano, all of Japan

[73] Assignee: Matsushita Electric Industrial Co., Ltd., Osaka, Japan

[21] Appl. No.: 861,989

[22] Filed: May 12, 1986

[30] Foreign Application Priority Data

May 15, 1985 [JP] Japan .................................. 60-103022
Sep. 12, 1985 [JP] Japan .................................. 80-202087

[51] Int. Cl.⁴ .......................... H04N 1/10; H04N 1/22
[52] U.S. Cl. ....................................... 358/286; 358/256
[58] Field of Search .......................... 358/256, 285, 286

[56] References Cited

U.S. PATENT DOCUMENTS 3,735,040 5/1973 Punt et al. ............................ 358/286
4,005,257 1/1977 Krallinger et al. .................. 358/256
4,317,138 2/1982 Bryan et al. .......................... 358/256
4,319,283 3/1982 Ozawa et al. ........................ 358/286

FOREIGN PATENT DOCUMENTS 87618 8/1978 Japan .................................. 358/256
39668 3/1982 Japan .................................. 358/256

Primary Examiner—Ronald C. Capossela
Attorney, Agent, or Firm—Stevens, Davis, Miller & Mosher

[57] ABSTRACT

A facsimile apparatus using a continuous length of recording paper with its first surface for recording and its second surface for transmitting scripts. Received facsimile signals are recorded on the first surface through a recording section, and scripts which are to be transmitted are written on the second surface and read through a reading section. This arrangement needs only one paper feeding passage and enables the paper to be efficiently used, since the non-recording surface of the paper can be used as a surface on which scripts are written.

13 Claims, 10 Drawing Figures

FACSIMILE APPARATUS

BACKGROUND OF THE INVENTION

1. Field of the Invention

The present invention relates to a facsimile apparatus in which a first surface of a continuous length of a recording paper is used for fax-reception recording and a second surface is used for fax-transmission scripts.

2. Description of Prior Art

Conventional methods for facsimile apparatus have involved an arrangement in which a sheet of paper for reception only and a sheet of paper for transmission only are separately prepared and a reception recording paper passage and a transmission paper passage are separately formed. Accordingly, conventional facsimile apparatus for use in office work have generally been large in dimension and have not been usable on desks as telephones.

One method for solving such a problem has been disclosed in Japanese Patent Unexamined Publication No. 107807/1975. According to this method, a flat portion is formed on a transference passage along which sheets of recording paper pass, and scripts are written by hand on the recording paper. The recording paper is used as a sheet of script transmission paper, thus aiming to reduce the size of an apparatus by combining transference passages.

Since, in this arrangement, the recording surface of the recording paper is also used as a script surface, portions on which a script to be transmitted are written cannot be used as recording paper, thus considerably increasing the amount of recording paper consumed compared with the above-described apparatus which uses sheets of paper for recording only.

SUMMARY OF THE INVENTION

The primary object of the present invention is to provide a facsimile apparatus which is compact and suitable for use on a desk.

Another object of the present invention is to provide a facsimile apparatus in which a sheet of paper is used both as script transmission paper and as reception recording paper, thereby simplifying the paper feed passages of the apparatus.

These objects of the present invention are achieved by using a first surface (recording surface) of a sheet of recording paper as a recording surface and using a second surface (non-recording surface) of the sheet of recording paper as a script transmission surface.

More concretely, a facsimile apparatus according to the present invention comprises:

a recording paper accommodating portion for accommodating a continuous length of recording paper;

a script table having a flat upper surface and disposed midway along a transference passage for the recording paper, the recording paper with its non-recording surface upturned being place on the script table;

a reading section disposed midway along the transference passage of the recording paper and adapted to allow scripts written on the non-recording surface of the recording paper to be read;

a recording section disposed midway along the transference passage of the recording paper and adapted for recording on the recording surface of the recording paper;

a conveying portion for conveying the recording paper along the transference passage; and a transmitting and receiving section for transmitting a signal read through the reading section and for receiving a signal to be supplied to the recording section.

In this arrangement provided in accordance with the present invention, the conveying portion may be constituted by a motor and a rotation transmitting mechanism for transmitting rotation of this motor to two rollers respectively disposed in the vicinity of the starting and finishing ends of the transference passage.

In this arrangement, the reading section may be constituted by a luminescent element, an optical system and a reading element.

According to the arrangement embodying the present invention, only one paper feeding passage is formed since a sheet of paper is used both as transmission script paper and as reception recording paper. It is thus possible to simplify the construction and reduce the size of the apparatus to a great extent.

Since the non-recording surface of the recording paper is used for a script to be transmitted, the recording paper can be used for a second time as the script transmission paper after it is rewound, and the script transmission paper can be used for a second time as recording paper after being rewound, thus enabling effective use of recording paper and reduction in cost.

DESCRIPTION OF THE PREFERRED EMBODIMENT

Figure 1:
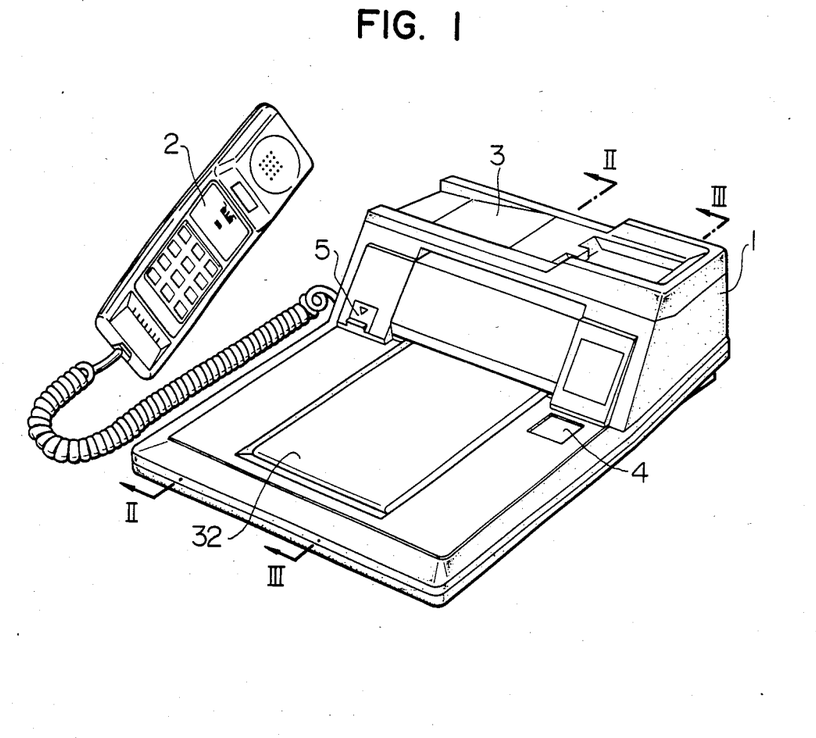
FIG. 1 is a perspective view of the overall constitution of a facsimile apparatus which is an embodiment of the present invention.
Figure 2:
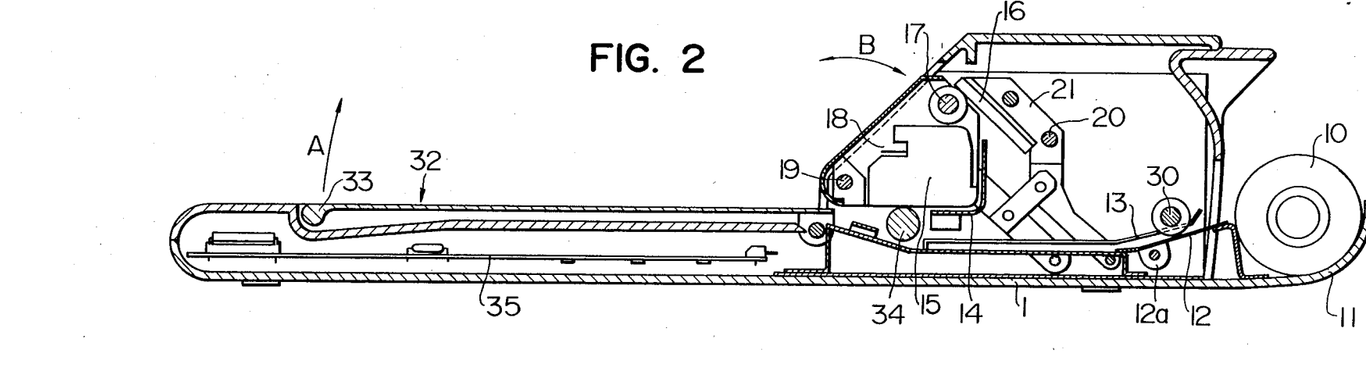
FIG. 2 is a cross-section taken along a line II—II of FIG. 1.
Figure 3:
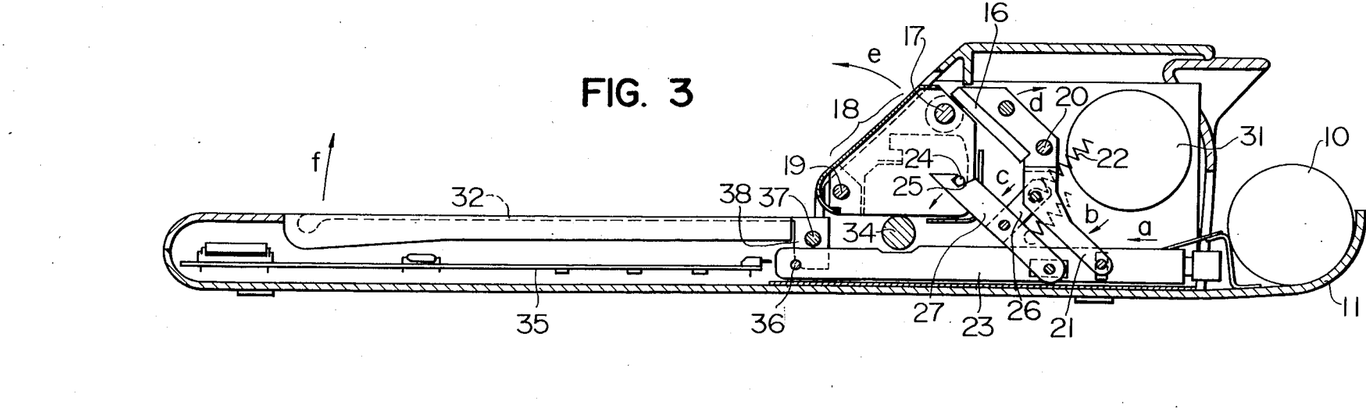
FIG. 3 is a cross-section taken along a line III—III of FIG. 1.

FIG. 1 shows the overall constitution of a facsimile apparatus which is an embodiment of the present invention. FIG. 2 is a cross-section taken along a line II—II of FIG. 1, and FIG. 3 is a cross-section taken along a line III—III of FIG. 1. The apparatus has a body 1 on which is formed a cradle 3 for accommodating a transmitting and receiving handset 2 constituting a telephone. Reference numerals 4 and 5 respectively indicate a faxtransmission switch and a paper feeding and rewinding switch.

As shown in FIG. 2, a rolled sheet of heat-sensitive recording paper 10 is placed on a recording paper receiving portion 11. Reference numerals 12, 13 and 14 indicate guide plates for guiding the recording paper 10, and a numeral 15 indicates an image sensor in which are incorporated a fluorescent lamp, an optical lens and reading element and which, together with a platen roller 17 facing a thermal recording head 16, integrally form an image sensor block 18. The image sensor block 18 is formed such as to be pivotally movable about shaft 19 in the direction indicated by arrows B.

The thermal recording head 16 is attached to one end of an arm 21 which is pivotally moved around a supporting shaft 20 and which is itself attached by means of a hook to a spring 22 so as to be constantly urged in the direction reverse to that shown by an arrow c. The thermal recording head 16 is thereby pressed against the platen roller 17 at a constant pressure. An opening-closing lever 23 for the image sensor block 18 is slidably attached to the other end of the arm 21. A latch 27 having a connecting portion 25 for engaging with a latch pin 24 disposed on the image sensor block 18 and connected to the arm 21 through a joint lever 26 is pivotally movably attached to the opening-closing lever 23. A paper feeding roller 30 shown in FIG. 2 is rotated by a stepping motor 31 in order to feed the heat-sensitive recording paper 10.

Figure 4:
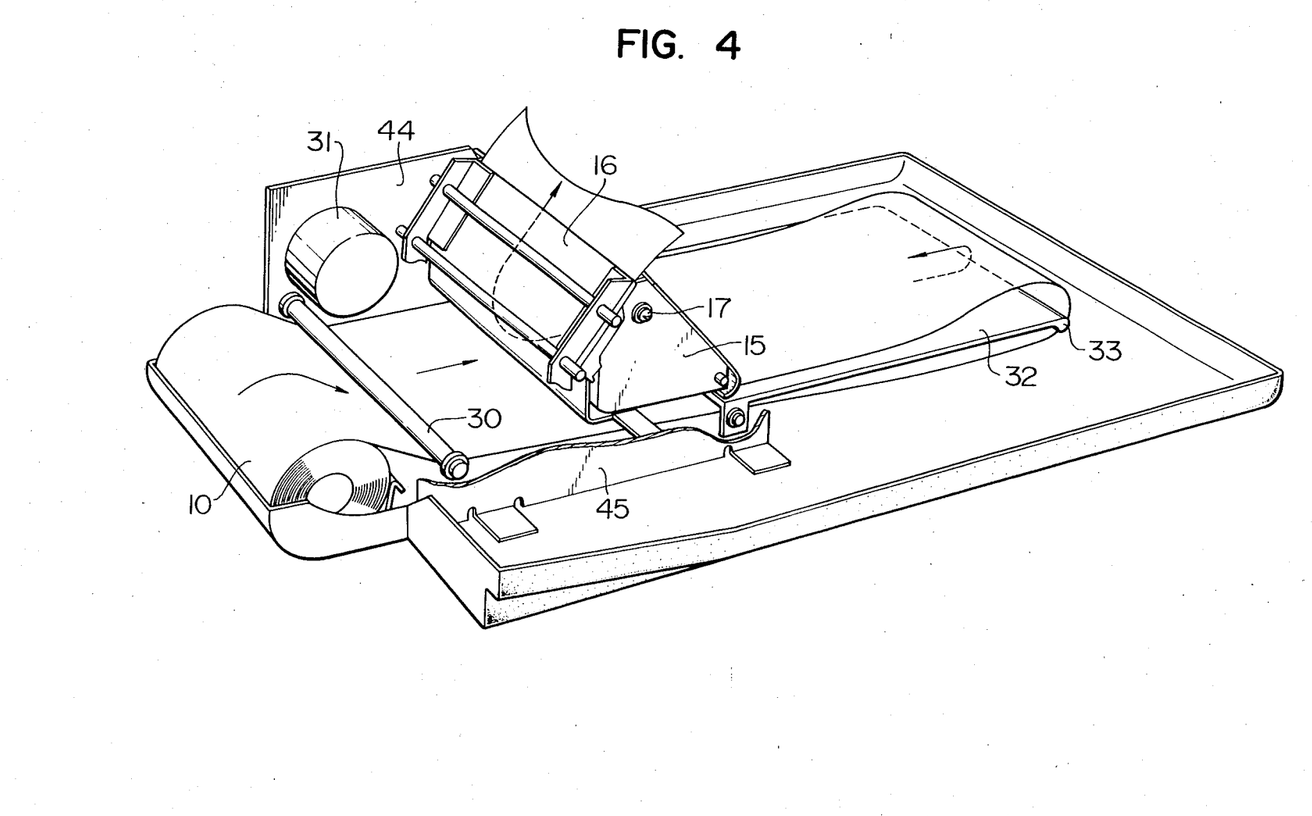
FIG. 4 is a partially cut-away perspective view showing a passage for feeding a sheet of paper unwound from a roll.

FIG. 4 shows in perspective a paper feed passage for the heat-sensitive recording paper 10, the apparatus being shown in a partially cut away form. The rolled sheet of heat-sensitive paper 10 placed in the recording paper receiving portion 11 is unwound and fed along the paper feed passage, as indicated by the arrow.

The paper passes, in the first place, under a script table 32 between the guide plates 12 and 13 while being fed forwards. It is turned around at an edge 33 and passages over the script table 32 before entering the interior of the apparatus again, and it then emerges to the outside after passing between the image sensor 15 and each of rotatable platen 34 and the guide plate 14 and passing between the thermal recording head 16 and the platen roller 17. The apparatus incorporates in the body 1 under the script table 32 a circuit board 35 having electronic components such as integrated circuits and resistances constituting transmitting and receiving sections.

Figure 5:
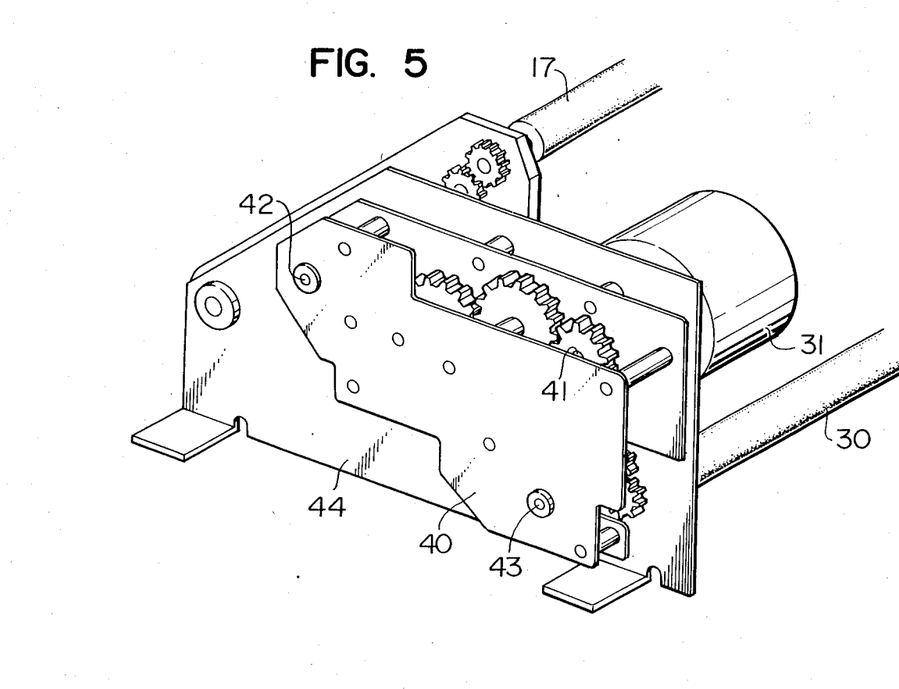
FIG. 5 is a perspective view of the essential part of a driving section of the apparatus according to the present invention.

FIG. 5 shows in perspective the main part of this embodimnt including a driving portion whose motion is entirely supplied by a stepping motor 31. The output shaft of the stepping motor 31 is connected to the input shaft 41 of a gear head 40 having a plurality of gears constituting a speed reduction mechanism. The rotation of the stepping motor 31 is decelerated by the gear head 40 and thereafter transmitted to the platen roller 17 and to the paper feeding roller 30 respectively connected to output shafts 42 and 43 of the gear head 40. The stepping motor 31 and the gear head 40 are supported on a side plate 44, and the platen roller 17 and the paper feeding roller 30 are supported by a pair of side plates 44 and 45 (refer to FIG. 4).

Next, the opening and closing mechanism of the image sensor block 18 and the script table 24 will be described with reference to FIG. 3. When the opening-closing lever 23 is moved in a direction indicated by an arrow a, the arm 21 is pivotally moved around the thermal recording head supporting shaft 20 in the direction indicated by an arrow b, and the thermal recording head 16 is detached from the platen roller 17, the joint lever 26 being simultaneosuly moved in linked relationship with the head. Then, the latch 27 which has until this stage been in engagement at its engaging portion 25 with the latch pin 24 on the image sensor block 18 is disengaged therefrom, and the image sensor block 18 is moved in the direction indicated by an arrow e by the force of a torsion coil spring (not shown). Simultaneously, the engagement between the edge 38 of the script table 32 and a script table latch pin 36 formed on the opening-closing lever 23 is released, and the script table 32 is opened by the force of a torsion coil spring (not shown) while pivoting around a script table supporting shaft 37 in the direction indicated by an arrow f.

The image sensor block and the script table 32 are closed when they are pushed by hand in the directions e and f respectively. Then, the engaging portion 25 of the latch 27 engages with the latch pin 24, and the script table 32 is prevented from pivotally moving by the engagement between its edge 38 and the latch pin 35, thus maintaining the closed state.

Next, the step of setting the heat-sensitive recording paper 10 will be described with reference to FIGS. 2 to 4 and FIGS. 6A through 6D.

Figure 6A:
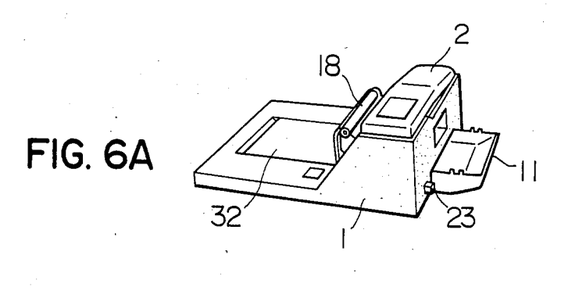
FIGS. 6A-6D are perspective views illustrating the setting of a paper roll.
Figure 6B:
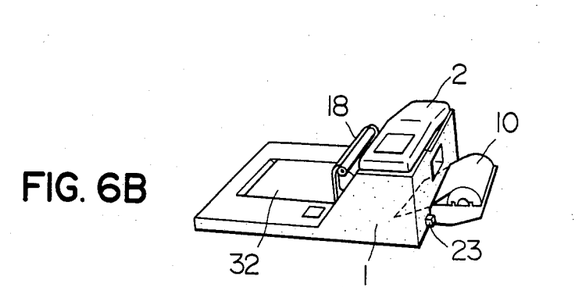
Figure 6C:
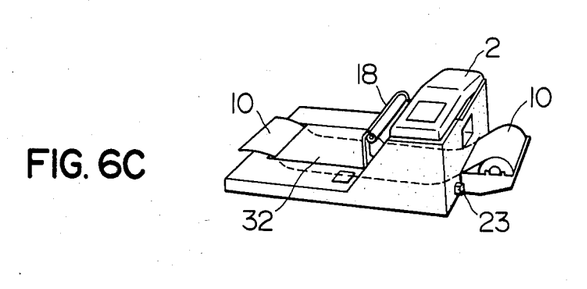
Figure 6D:
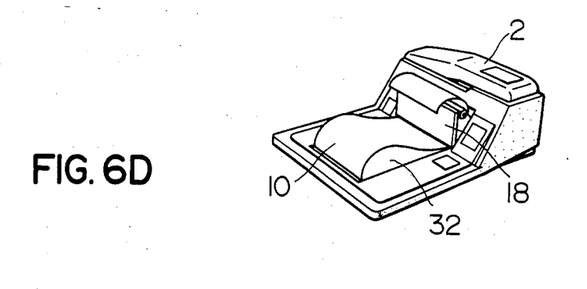

The opening-closing lever 23 shown in FIG. 3 is first pushed down so that the image sensor block 18 is opened and set to be in the state shown in FIG. 6(A), and the heat-sensitive recording paper roll 10 is placed on the recording paper receiving portion 11. Next, as shown in FIG. 6B, the leading edge of the recording paper 10 is introduced between the guide plates 12 and 13, and the switch 5 is thereafter pushed so as to move a lever (not shown) and make the guide plate 12 pivotally move around a shaft 12a, thereby pinching the recording paper 10 between the guide plate 12 and the paper feeding roller 30. Simultaneously, the stepping motor 31 is driven so as to rotate the paper feeding roller 30, and the recording paper 10 is thereby supplied automatically. When a given length of the recording paper 10 is exposed in front of the script table 32 (refer to FIG. 6C), the rotation of the paper feeding roller 30 is stopped.

Then, after the recording paper 10 has been pulled forward a little further by hand such that the recording paper emerges to some extent from the upper surface of the image sensor block 18 which is at this stage open (refer to FIG. 6D), the image sensor block 18 is closed, thus completing the step of setting the recording paper 10 in the apparatus.

The operation of transmission and reception will now be described. For transmission of a script, the object of a transmission is first written on the reverse side of the recording paper located on the script table 32 by means of a writing instrument. When the script thereby written is to be transmitted, a facsimile apparatus at the receiving end is called by using the transmitting and receiving handset 2, and the transmission switch 4 is thereafter pushed so that the recording paper is fed under the reading section. The script is read while the recording paper passes under the image sensor 15, thus transmitting the script.

On the other hand, at the time of reception, the thermal recording head 16 causes the surface of the heat-sensitive recording paper 10 to be colored in a heat-sensing manner in accordance with received facsimile signals.

Next, the usage of the apparatus embodying the present invention will be described.

Figure 7:
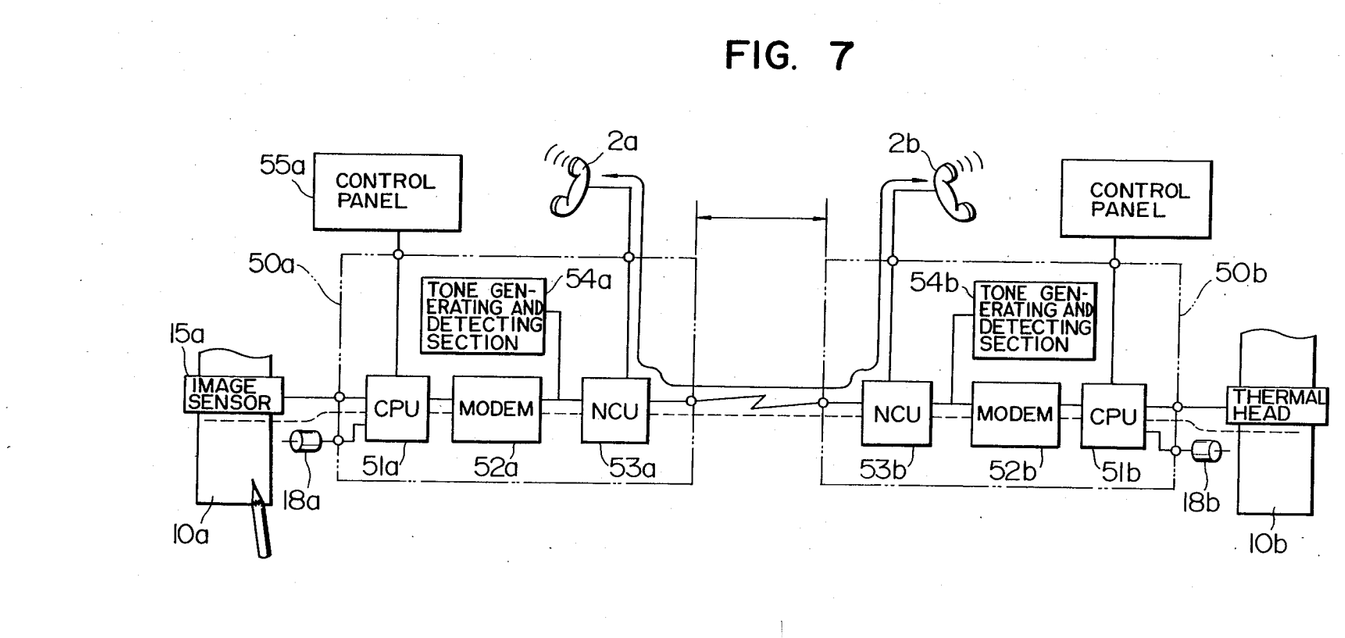
FIG. 7 is a diagram schematically showing the flows of a voice signal and a picture signal.

FIG. 7 schematically shows the flow of voice signals and image signals in this apparatus. As shown in this figure, the transmitted and receiving sections 50a and 50b are composed of microprocessors (CPU) 51a and 51b, modems 52a and 52b, NCUs 53a and 54a, and tone generating and detecting sections 54a and 54b.

In a waiting state, the transmitting and receiving handset modules 2a and 2b are connected to a telephone circuit. When, in this state, a mode switch disposed on a control panel 55 is pushed to the at-home side, the telephone function is selected with priority to facsimile function so that the apparatus is used as an ordinary telephone. If, at this time, the transmission switch 4 is pushed, the CPU 51a switches the telephone circuit from the side of the transmitting and receiving handset module 2a to the side of the modem 52 after confirming the communicated state. The facsimile transmission is thus started.

Image signal transmission starts and finishes in accordance with tone signal exchanges, and the facsimile transmission starts when a call tone signal is supplied from the tone generating section 54a located on the transmission side. On the reception side, this starting tone is constantly awaited, and the operation of reception is carried out when the starting tone is detected. The synchronization between transmission and reception is thereafter carried out in accordance with phase signals. When the synchronization is completed, a tone signal which represents the completed state of preparation for reception is transmitted from the reception side, the transmission of image information written on the script is started.

The image information written on the script paper is converted into electrical signals by an image sensor 15a and is accumulated in an interior memory incorporated in the CPU 51. Each unit of the read process carried out by the image sensor 15a corresponds to one line. Every time a line of information is read, a stepping motor 18a feeds a length of paper corresponding to one line. Items of accumulated image information are successively inputted into the modem 52a, and they are thereby converted into voice range signals and output to the telephone circuit.

On the reception side, received modulated signals are demodulated by the modem 52b, and the original image signals are accumulated in the interior memory of the CPU 51a. Each unit of the accumulated image signals corresponding to one line is successively transferred to the thermal recording head 16b, which causes a sheet of heat-sensitive recording paper 10b to be colored in accordance with the image signals. Every time an item of information for one line is recorded, a stepping motor 18b feeds a length of paper corresponding to one line, in a manner similar to that of the read operation.

When the transmission process of image signals for one page is completed, a tone signal indicating the message ending is transmitted from the transmission side, and, in response to this, a message recognition tone signal is output from the reception side. After this sequence has finished, the telephone circuit is returned to the side of the transmitting and receiving handset module 2b, and telephone communications become possible.

What is claimed is:

1. A facsimile apparatus comprising:
   a recording paper accommodating portion for accommodating a continuous length of recording paper;
   a script table having a flat upper surface and disposed midway along a feeding passage for said recording paper, said recording paper with its non-recording surface upturned being place on said script table;
   a reading section disposed midway along said feeding passage of said recording paper and adapted to allow scripts written on said non-recording surface of said recording paper to be read;
   a recording section disposed midway along said feeding passage of said recording paper and adapted for recording on said recording surface of said recording paper;
   a conveying portion for conveying said recording paper along said feeding passage; and
   a transmitting and receiving section for transmitting a signal read through said reading section and for receiving a signal to be supplied to said recording section.

2. A facsimile apparatus according to claim 1, wherein said continuous length of recording paper is provided in the form of a rolled sheet.

3. A facsimile apparatus according to claim 1, wherein a sheet of heat-sensitive paper is used as said recording paper, and said recording section includes a heat recording head.

4. A facsimile apparatus comprising:
   a recording paper accommodating portion for accommodating a continuous length of recording paper;
   a script table having a flat upper surface and disposed midway along a feeding passage for said recording paper, said recording paper with its non-recording surface upturned being place on said script table;
   a reading section disposed midway along said feeding passage of said recording paper and adapted to allow scripts written on said non-recording surface of said recording paper to be read;
   a recording section disposed midway along said feeding passage of said recording paper and adapted for recording on said recording surface of said recording paper;
   a conveying portion for conveying said recording paper along said feeding passage, said conveying portion having a motor, a rotation transmitting mechanism for transmitting the rotation of said motor to two rollers disposed in the vicinity of the starting and finishing ends of said feeding passage; and
   a transmitting and receiving section for transmitting a signal read through said reading section and for receiving a signal to be supplied to said recording section.

5. A facsimile apparatus according to claim 4, wherein said continuous length of recording paper is provided in the form of a rolled sheet.

6. A facsimile apparatus according to claim 4, wherein a sheet of heat-sensitive paper is used as said recording paper, and said recording section includes a heat recording head.

7. A facsimile apparatus according to claim 4, wherein said motor is a stepping motor.

8. A facsimile apparatus according to claim 4, wherein said rotation transmitting mechanism includes a speed reduction mechanism having a combination of a plurality of gears.

9. A facsimile apparatus comprising:
   a recording paper accommodating portion for accommodating a continuous length of recording paper;
   a script table having a flat upper surface and disposed midway along a feeding passage for said recording paper, said recording paper with its non-recording surface upturned being place on said script table;

a reading section disposed midway along said feeding passage of said recording paper and having luminescent, optical and reading elements adapted to allow scripts written on said non-recording surface of said recording paper to be read;

a recording section disposed midway along said feeding passage of said recording paper and adapted for recording on said recording surface of said recording paper;

a conveying portion for conveying said recording paper along said feeding passage; and a transmitting and receiving section for transmitting a signal read through said reading section and for receiving a signal to be supplied to said recording section.

10. A facsimile apparatus according to claim 9, wherein said continuous length of recording paper is provided in the form of a rolled sheet.

11. A facsimile apparatus according to claim 9, wherein said recording paper is heat-sensitive paper, and said recording section includes a heat recording head.

12. A facsimile apparatus according to claim 9, wherein said luminescent, optical and reading elements constitute one integrally formed block.

13. A facsimile apparatus according to claim 12, wherein said integrally formed block is pivotally movable around an axis.

* * * * *